(12) United States Patent
Tuukkanen

(10) Patent No.: US 9,684,773 B2
(45) Date of Patent: Jun. 20, 2017

(54) METHOD AND APPARATUS FOR PROVIDING PRODUCT LEAK SOURCE IDENTIFICATIONS

(75) Inventor: Marko Tapio Tuukkanen, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 1003 days.

(21) Appl. No.: 13/282,930

(22) Filed: Oct. 27, 2011

(65) Prior Publication Data
US 2013/0111352 A1   May 2, 2013

(51) Int. Cl.
- *G06F 21/24* (2006.01)
- *G06Q 99/00* (2006.01)
- *G06F 3/048* (2013.01)
- *G06F 21/14* (2013.01)
- *G06F 21/10* (2013.01)
- G06F 21/88 (2013.01)
- G06F 21/64 (2013.01)

(52) U.S. Cl.
CPC .............. *G06F 21/14* (2013.01); *G06F 21/10* (2013.01); *G06F 21/645* (2013.01); *G06F 21/88* (2013.01)

(58) Field of Classification Search
CPC ........... G06F 21/16; G06F 21/36; G06F 21/55
USPC .................................. 715/744, 764; 726/26
See application file for complete search history.

(56) References Cited

U.S. PATENT DOCUMENTS

| | | | |
|---|---|---|---|
| 8,140,664 B2* | 3/2012 | Huang et al. ................ 709/224 |
| 8,346,206 B1* | 1/2013 | Andrus et al. ............... 455/401 |
| 2003/0018907 A1* | 1/2003 | Le .................... G11B 20/00086 713/190 |
| 2003/0191946 A1* | 10/2003 | Auer ....................... G06F 21/10 713/182 |
| 2006/0136746 A1* | 6/2006 | Al-Khateeb ..... G11B 20/00086 713/189 |
| 2011/0246913 A1* | 10/2011 | Lydick et al. ................ 715/762 |
| 2011/0296325 A1* | 12/2011 | Orr ............................... 715/764 |
| 2012/0174232 A1* | 7/2012 | Dharawat et al. .............. 726/26 |

OTHER PUBLICATIONS

Muthukumaran et al., Measuring integrity on mobile phone systems, 2008, dl.acm.org.*

* cited by examiner

*Primary Examiner* — Jordany Nunez
(74) *Attorney, Agent, or Firm* — Ditthavong & Steiner, P.C.

(57) ABSTRACT

An approach is provided for providing product leak source identification. A product leak detection platform determines one or more identifiers associated with one or more devices. The product leak detection platform further processes and/or facilitates a processing of the one or more identifiers to determine one or more variations of one or more user interface elements to be presented in at least one user interface of the one or more devices. The product leak detection platform also causes, at least in part, an installation of the one or more variations of the one or more user interface elements at the one or more devices, wherein a rendering of the one or more variations at the one or more devices facilitates, at least in part, a determination of the one or more identifiers.

20 Claims, 7 Drawing Sheets

METHOD AND APPARATUS FOR PROVIDING PRODUCT LEAK SOURCE IDENTIFICATIONS

BACKGROUND

Service providers and device manufacturers (e.g., wireless, cellular, etc.) are continually challenged to deliver value and convenience to consumers by, for example, providing compelling network services, applications, etc. Mobile devices with various methods of connectivity are now becoming the primary gateway to various services provided via the Internet and also a major storage point for information. As the scope and variety of the available services (e.g., applications) increases, interoperability and combined use of these services becomes a major challenge. Today, many service and application providers face the challenge of preventing unauthorized access to vital product information, for instance, due to product leaks. Such products are typically provided by cooperation among multiple companies, subcontractors, etc. The likelihood of product leaks increases exponentially when the number of companies and individuals involved increases. At the same time, companies face the challenge of identifying the source of product leaks.

Some Example Embodiments

Therefore, there is a need for an approach for providing product leak source identification.

According to one embodiment, a method comprises determining one or more identifiers associated with one or more devices. The method also comprises processing and/or facilitating a processing of the one or more identifiers to determine one or more variations of one or more user interface elements to be presented in at least one user interface of the one or more devices. The method further comprises causing, at least in part, an installation of the one or more variations of the one or more user interface elements at the one or more devices, wherein a rendering of the one or more variations at the one or more devices facilitates, at least in part, a determination of the one or more identifiers.

According to another embodiment, an apparatus comprises at least one processor, and at least one memory including computer program code for one or more computer programs, the at least one memory and the computer program code configured to, with the at least one processor, cause, at least in part, the apparatus to determine one or more identifiers associated with one or more devices. The apparatus is also caused to process and/or facilitate a processing of the one or more identifiers to determine one or more variations of one or more user interface elements to be presented in at least one user interface of the one or more devices. The apparatus is further caused to install the one or more variations of the one or more user interface elements at the one or more devices, wherein a rendering of the one or more variations at the one or more devices facilitates, at least in part, a determination of the one or more identifiers.

According to another embodiment, a computer-readable storage medium carries one or more sequences of one or more instructions which, when executed by one or more processors, cause, at least in part, an apparatus to determine one or more identifiers associated with one or more devices. The apparatus is also caused to process and/or facilitate a processing of the one or more identifiers to determine one or more variations of one or more user interface elements to be presented in at least one user interface of the one or more devices. The apparatus is further caused to install the one or more variations of the one or more user interface elements at the one or more devices, wherein a rendering of the one or more variations at the one or more devices facilitates, at least in part, a determination of the one or more identifiers.

According to another embodiment, an apparatus comprises means for determining one or more identifiers associated with one or more devices. The apparatus also comprises means for processing and/or facilitating a processing of the one or more identifiers to determine one or more variations of one or more user interface elements to be presented in at least one user interface of the one or more devices. The apparatus further comprises means for causing, at least in part, an installation of the one or more variations of the one or more user interface elements at the one or more devices, wherein a rendering of the one or more variations at the one or more devices facilitates, at least in part, a determination of the one or more identifiers.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing product leak source identification are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
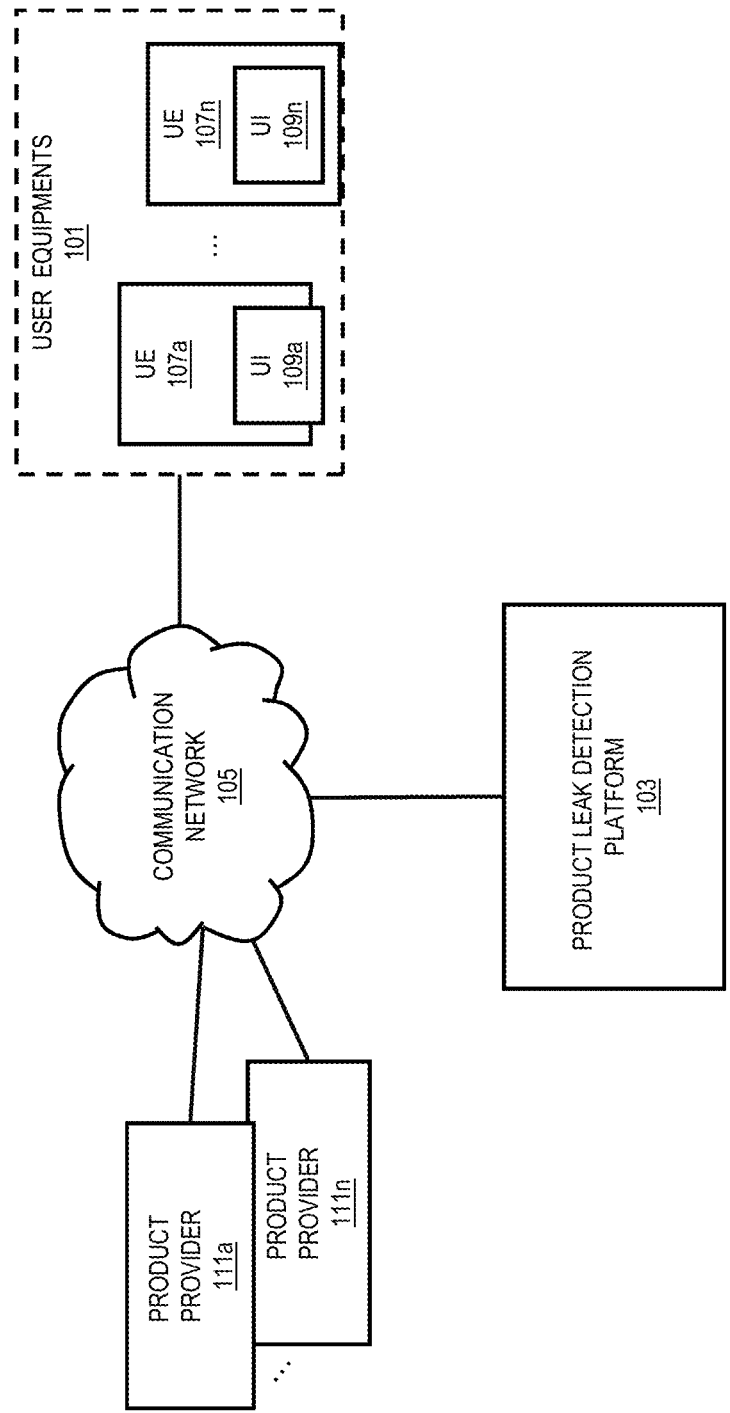
FIG. 1 is a diagram of a system capable of providing product leak source identification, according to one embodiment.

FIG. 1 is a diagram of a system capable of providing product leak source identification, according to one embodiment. As mentioned, product leaks are a common problem faced by mobile device vendors, information technology companies, application providers, etc. Product leaks generally expose private and confidential information relating to products, for instance, prior to the official product release date. For example, unauthorized publications on the Internet may show images of the device hardware from multiple angles along with various screenshots of the user interface (UI). Moreover, the device cover may be removed to expose the individual components inside. Nonetheless, the source of the unauthorized publications and/or the product leaks are usually undetectable since any identification, such as International Mobile Equipment Identity (IMEI) codes of the mobile device, possible serial numbers (e.g., whether in the hardware or in the software-based user interface), etc., are typically covered up or removed in the unauthorized publications of such images and/or screenshots. Although watermarks have been commonly used in documents and pictures to prevent such unauthorized publications, typical watermarks are easy to detect and can be easily removed using common software applications and techniques (e.g., decrease picture quality to hide watermark, erase watermark, etc.). Therefore, there is a need for an approach for providing unique UI features that are hard to detect and remove by unauthorized entities and, at the same time, provide identification of the sources of any unauthorized leak of the UI elements.

To address this problem, a system 100 of FIG. 1 introduces the capability to provide product leak source identification. By way of example, the system 100 may determine identifiers associated with respective devices. The identifiers may, for instance, include IMEI, a user name, a user account, a user communication identifier, a device name, a software version identifier, a hardware version identifier, etc. The identifiers may then be processed to determine variations of user interface elements to be presented in user interfaces of the respective devices. The user interface elements may include icons, menus, task bar items, graphical elements, buttons, etc., and the variations may include shapes, sizes, positions, colors, fonts, formats, styles, sounds, animations, etc. In one scenario, for instance, user interface elements for a particular application may vary slightly in size and shape. As such, each of the various user interface elements for the particular application may uniquely represent different identifiers associated with the respective devices. The variations of the user interface elements may thereafter be installed at the respective devices such that a rendering of the variations at the one or more devices may, for instance, facilitate a determination of the one or more identifiers. It is noted that increasing number of industries, service providers, parties leaking the information, etc., are spending time on analyzing the user interfaces associated with devices and the services provided to the users via those devices. As the user interfaces are becoming more and more important in product leaks, generating variations of user interfaces to contain unique identification codes enables the authorized entities to discover sources of product leaks by analyzing the leaked user interfaces.

In one embodiment, when each user interface contains a unique identifier, the users leaking the information may compromise the possibility of being identified by sharing the pictures of their user interfaces, for example, sharing screenshots online, sharing printed copies or hard copies of the screenshots, etc. By way of example, the UI components may differ between devices. As such, manufacturers or providers suspecting a leak can easily identify the source of the leak by comparison between the leaked images and the components specific to various UIs.

In one embodiment, inclusion of unique components in UIs may reduce the number of product leaks and minimize brand damage by increasing the risk of being identified since identification of the source of such product leaks are hard to detect and remove by unauthorized entities. Because the source identification is hard to remove, detection of the source of the leaks is made easier, regardless of whether the leaked images show only a portion or all of the UI of the device. In cases where only a portion is shown, the source of the leak may still be detected if sufficient unique identifiers are presented in the UI portion.

As shown in FIG. 1, the system 100 comprises a set of user equipments (UEs) 101 having connectivity to a product leak detection platform 103 via a communication network 105. The set 101 includes UEs 107a-107n equipped with user interfaces (UIs) 109a-109n. The UEs 107a-107n also have connectivity with product providers 111a-111n via the communication network 105. The products provided by the product providers 111a-111n may include services, applications, processes, etc. Furthermore, the provided products may utilize the UIs 109a-109n for communication with the users of the UEs 107a-107n as input, output, or a combination thereof. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107n are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107n can support any type of interface to the user (such as "wearable" circuitry, etc.).

By way of example, the UEs 107a-107n, and the product leak detection platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
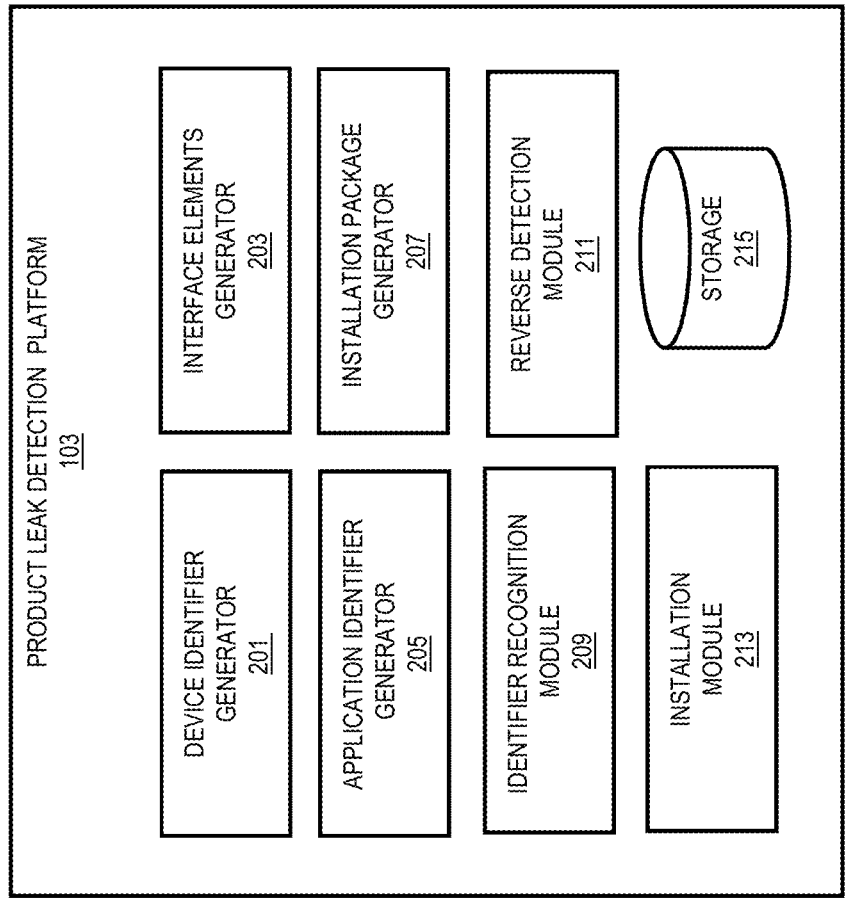
FIG. 2 is a diagram of the components of a product leak detection platform, according to one embodiment.

FIG. 2 is a diagram of the components of the product leak detection platform, according to one embodiment. By way of example, the product leak detection platform 103 includes one or more components for providing product leak source identification. It is contemplated that the functions of these components may be combined in one or more components or performed by other components of equivalent functionality. In this embodiment, the product leak detection platform 103 includes a device identifier generator 201, an interface elements generator 203, an application identifier generator 205, an installation package generator 207, an identifier recognition module 209, a reverse detection module 211, an installation module 213, and a storage 215.

Figure 3:
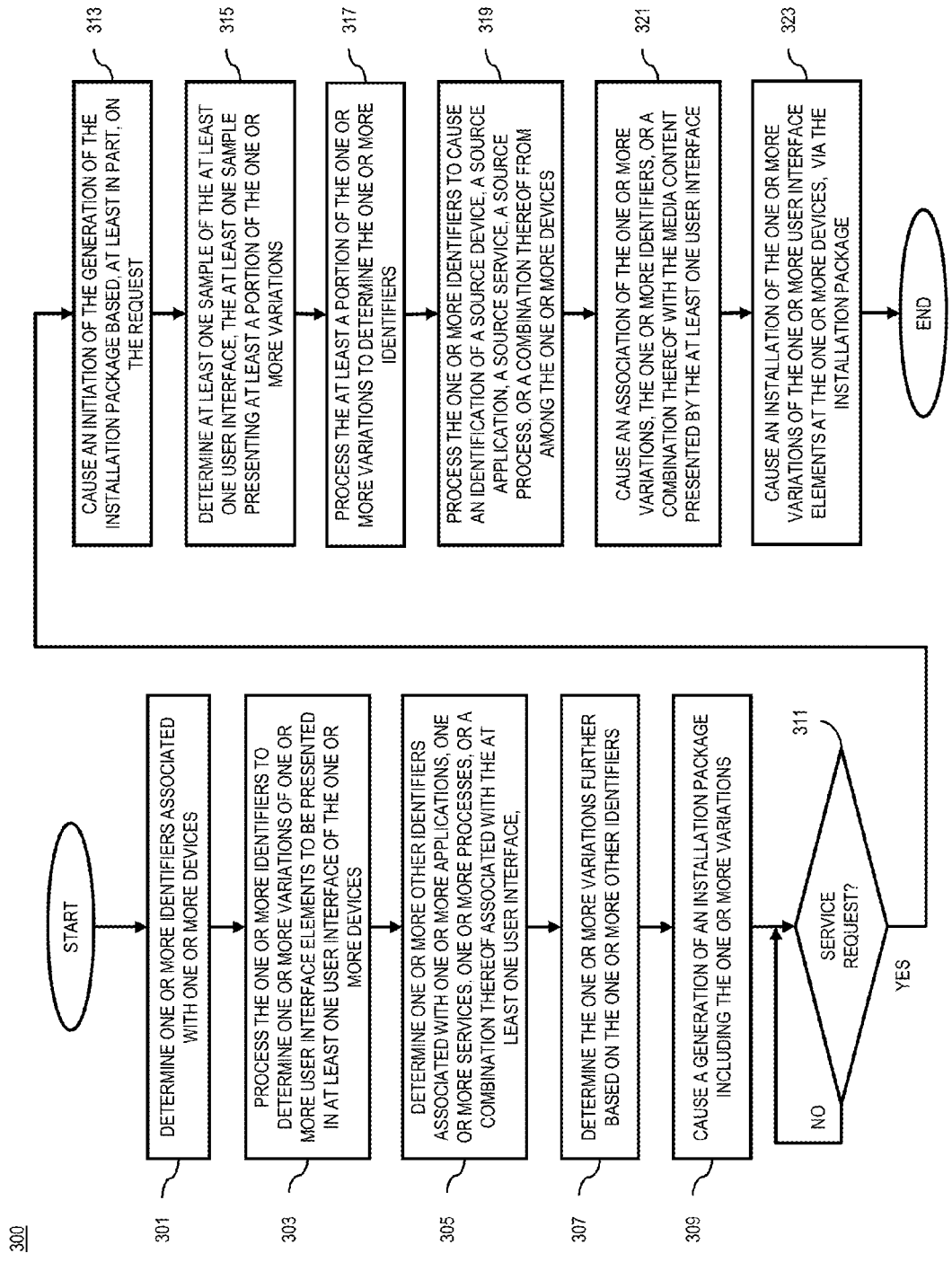
FIG. 3 is a flowchart of a process for providing product leak source identification, according to one embodiment.
Figure 6:
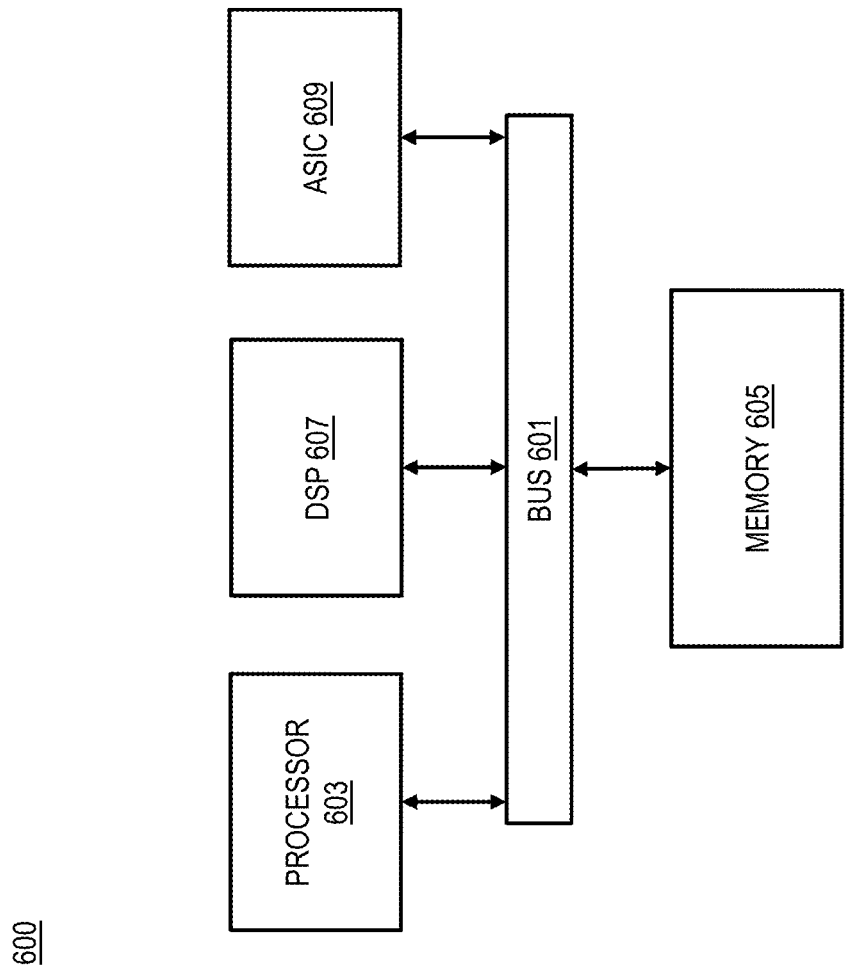
FIG. 6 is a diagram of a chip set that can be used to implement an embodiment of the invention.

FIG. 2 is described with reference to FIG. 3, wherein FIG. 3 is a flowchart of a process for providing product leak source identification, according to one embodiment. In one embodiment, the product leak detection platform 103 performs the process 300 and is implemented in, for instance, a chip set including a processor and a memory as shown in FIG. 6.

In one embodiment, in step 301 of process 300 of FIG. 3, the device identifier generator 201 determines one or more identifiers associated with one or more UEs 107a-107n. The one or more identifiers may include, for example, an International Mobile Equipment Identity (IMEI), a user name, a user account, a user communication identifier (e.g., email address, phone number, instant message handle, etc.), a device name, a software version identifier, a hardware version identifier, or a combination thereof. The device identifier generator 201 may store the determined identifiers in storage 215, on local storages of UEs 107a-107n, on a storage accessible via communication network 105, or a combination thereof.

In one embodiment, per step 303 of FIG. 3, the interface elements generator 203 processes and/or facilitates a processing of the one or more identifiers to determine one or more variations of one or more user interface elements to be presented in at least one of the user interface UIs 109a-109n of the one or more UEs 107a-107n. By way of example, the one or more user interface elements may include one or more icons, one or more menus, one or more task bar items, one or more graphical elements, one or more buttons, or a combination thereof. Furthermore, the one or more variations of one or more user element variations may be based, at least in part, on one or more shapes, one or more sizes, one or more positions, one or more colors, one or more fonts, one or more formats, one or more styles, one or more sounds, one or more animations, or a combination thereof.

In one embodiment, per step 305 of FIG. 3, the application identifier generator 205 determines one or more other identifiers associated with one or more applications, one or more services, one or more processes, or a combination thereof (e.g., provided by one or more product providers 111*a*-111*n*) associated with the at least one user interface 109*a*-109*n*.

In one embodiment, per step 307 of FIG. 3, the interface elements generator 203 utilizes the one or more other identifiers for determining the one or more variations of the one or more user interface elements. The one or more other identifiers may be, for example, service or application registry information, code, specifications data, requirements, etc.

In one embodiment, the one or more variations of the user interface elements may comprise, at least in part, of one or more user interface identifiers associated with the UIs 109*a*-109*n* of the one or more UEs 107*a*-107*n*, the one or more applications, the one or more services, the one or more processes, or a combination thereof provided by the product providers 111*a*-111*n*.

In one embodiment, per step 309 of FIG. 3, the installation package generator 207 causes, at least in part, a generation of an installation package for the installation on the UEs 107*a*-107*n* of the UI elements variations associated with the applications, services, processes, or a combination thereof provided by the product providers 111*a*-111*n*. An installation package will include the one or more variations of the UI elements, wherein the installation of the one or more variations is via the installation package.

In one embodiment, per step 311 of FIG. 3, the installation package generator 207 determines a request to install one or more applications, one or more services, one or more processes, or a combination thereof provided by the product providers 111*a*-111*n* associated with the one or more variations, on one or more UEs 107*a*-107*n*. The request may be generated by a user of UEs 107*a*-107*n* using a UI 109*a*-109*n* on a UE 107*a*-107*n*, by a product provider 111*a*-111*n* (for example in cases where a user opted for automatic updates of services, applications, and processes), by the product leak detection platform 103 itself (for example, when new and/or updated identifiers and/or variations are detected and need to be added to the installation packages), or a combination thereof.

In one embodiment, upon determining an installation request, per step 313 of FIG. 3, the installation package generator 207 causes, at least in part, an initiation of the generation of the installation package based, at least in part, on the request. The installation package may be then stored on storage 215, on a local storage on UE 107*a*-107*n*, elsewhere on the communication network 105, or a combination thereof.

In one embodiment, per step 315 of FIG. 3, the identifier recognition module 209 determines at least one sample of the at least one user interface, the at least one sample presenting at least a portion of the one or more variations. The at least one sample of the at least one user interface may be extracted from an image (e.g., an image posted online), a screen shot from a UI 109*a*-109*n* associated with a UE 107*a*-107*n*, a video clip, an animation, an audio clip, or a combination thereof. The at least one sample may then be stored on storage 215, on a local storage on UE 107*a*-107*n*, elsewhere on the communication network 105, or a combination thereof.

In one embodiment, per step 317 of FIG. 3, the identifier recognition module 209 processes and/or facilitates a processing of the at least a portion of the one or more variations to determine the one or more identifiers. The identifier recognition module 209 may extract the at least one or more variations of the one or more user interface elements from the user interface samples and determine the one or more identifiers from the variations using various methods such as, for example, image recognition techniques. The determined identifiers may then be stored on storage 215, on a local storage on UE 107*a*-107*n*, elsewhere on the communication network 105, or a combination thereof.

In one embodiment, per step 319 of FIG. 3, the reverse detection module 211 processes and/or facilitates a processing of the one or more identifiers to cause, at least in part, an identification of a source UE 107*a*-107*n*, a source application, a source service, a source process, provided by the product providers 111*a*-111*n*, or a combination thereof from among the one or more UEs 107*a*-107*n*.

In one embodiment, the at least one user interface (UI) 109*a*-109*n* is for presenting media content to the user of UEs 107*a*-107*n*. In this embodiment, per step 321 of FIG. 3, the device identifier generator 201 causes, at least in part, an association of the one or more variations of the UI elements, the one or more identifiers, or a combination thereof, determined per step 303, with the media content presented via UI 109*a*-109*n*. For example, if the media content is a video played by a product provided by the product providers 111*a*-111*n*, the unique identifiers of the UI 109*a*-109*n* provided by the device identifier generator 201 can be recognized and as a result the source of leak of the video can be found.

In one embodiment, per step 323 of FIG. 3, the installation module 213 causes, at least in part, an installation of the one or more variations of the one or more user interface elements such as, for example, on one or more shapes, one or more sizes, one or more positions, one or more colors, one or more fonts, one or more formats, one or more styles, one or more sounds, one or more animations, or a combination thereof, at the one or more UEs 107*a*-107*n*. It is noted, for instance, that the rendering of the one or more variations at the one or more UEs 107*a*-107*n* can facilitate, at least in part, a determination of the one or more identifiers by the device identifier generator 201. By way of example, automated image recognition techniques may be used to detect the rendered variations to determine unique identifiers associated with the rendered variations. In other embodiments, the unique identifiers may be detected by human eyes, by using digital copies (e.g. scanned from paper copies), or a combination thereof.

Figure 4:
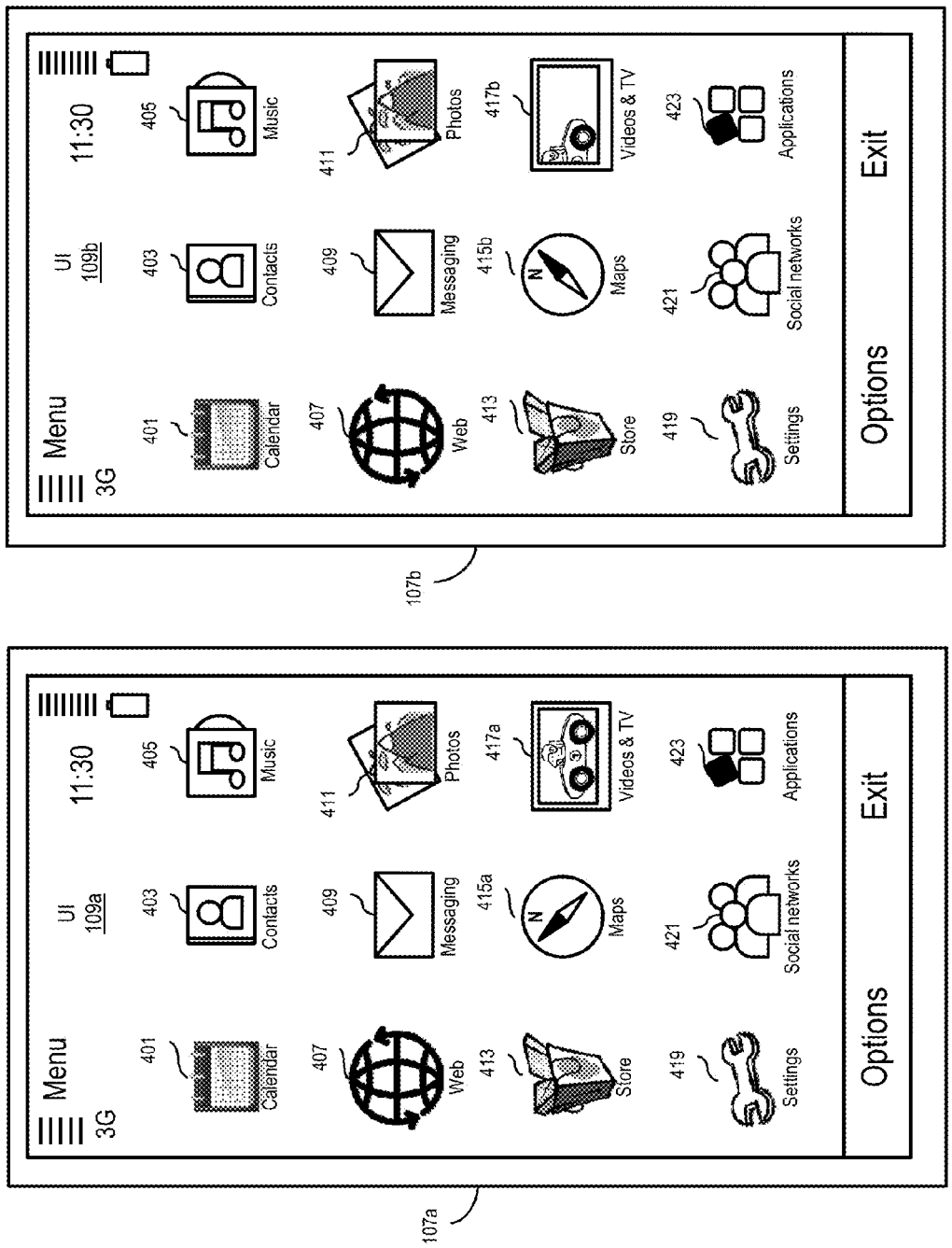
FIG. 4 is a diagram of user interfaces utilized in the processes of FIG. 3, according to one embodiment.

FIG. 4 is a diagram of user interfaces utilized in the processes of FIG. 3, according to one embodiment. FIG. 4 illustrates a UE 107*a* and a basic UI 109*a* associated with UE 107*a* as well as a UE 107*b* and a basic UI 109*b*. As shown, the UI 109*a* includes elements (e.g., icons) 401, 403, 405, 407, 409, 411, 413, 415*a*, 417*a*, 419, 421, and 423 that respective represent services, applications and processes provided to the user of UE 107*a*, such as a calendar, contacts, music, etc. On the other hand, the UI 109*b* includes elements 401, 403, 405, 407, 409, 411, 413, 415*b*, 417*b*, 419, 421, and 423.

In one embodiment, the elements of UI 109*a* and UI 109*b* are given values by the product leak detection platform 103, which allow unlimited number of unique identifiers for each UI 109*a*, 109*b*, etc. In one scenario, each of the elements 401-423 may be assigned random numbers, via a random number generator, as unique identifiers. This feature can be especially useful, for instance, when identifying stolen prototypes. By way of example, the identifier recognition module 209 can use automated image recognition techniques to detect the unique identifiers.

In one embodiment, the product leak detection platform 103 may generate values for all UI elements 401-423. In other embodiment, only some of the UI elements may be randomly selected to have modified characteristics (e.g., element 415*a* and 417*a* vs. element 415*b* and 417*b*). The record of these modifications can be stored in storage 215 with the IMEI code and other details of the UEs 107*a*-107*n*.

In one scenario, the device identifier generator 201 may associate the stored data of the UE 107*b* with the user who is given the UE 107*b*. If, for instance, an image of the UI 109*b* is captured, the UE 107*b* can be identified from the image based on the various UI elements of the UI 109*b* (e.g., elements 415*b* and 417*b*), as compared with the various UI elements of the UI 109*a* of the UE 107*a*. As an example, the maps application compass pin of element 415*b* points to a different direction than the maps application compass pin of element 415*a*, and the car image of the element 417*b* representing "Videos & TV" has been shifted from the car image of the element 417*a*.

In another scenario, all UI elements 401 to 423 may be associated with 10 different optional values. Therefore, different combination of the 12 UI elements 401-423 (e.g., application icons) with 10 different values for each element can generate $10^{12}$ different combinations and identifiers. For example, if all of the 12 icons have different values, the UI 109*a* may be described with (000000000000) as an identifier, while UI 109*b* may have an identifier as (000000011000), wherein the modified icons 415*b* and 417*b* are each given a value of 1.

In one embodiment, the product leak detection platform 103 can assign unique identifiers to each specific version of the product, which can then be linked with the unique identifier of the UI 109*a*-109*n* of UE 107*a*-107*n*. As an example, a UE 107*a*-107*n* (e.g., a smart phone) has an unique IMEI code. This unique code can be connected with the unique UI code generated by the product leak detection platform 103. This connection can be then stored in a database in storage 215.

In one embodiment, assignment of unique identifiers to UI elements enables product providers 111*a*-111*n* to protect their intellectual property and non-public products, wherein the number of individual products can be counted in hundreds or thousands. This may increases the reliability of identifying the products from the unique UI identifier. At the same time, it will be harder for an unauthorized entity (e.g., user of UE 107*b*) to detect the unique UI elements 401-423, as other reference products (e.g., UE 107*a*) may not be available to the unauthorized entity for comparison.

In one embodiment, the device identifier generator 201 may give a unique UI 109*a*-109*n* identifier to a product (e.g., an application, service, process, etc.) as the product is being developed. Subsequently, in a UE 107*a*-107*n* the UI 109*a*-109*n* identifier can be given at the time the product is being created or installed (e.g., by the installation package provided by the installation package generator 207. In a further embodiment, as part of the UE 107*a*-107*n* software, the user may not be given the authority to modify the unique elements of UI 109*a*-109*n*. Nonetheless, because an original version for UIs 109*a*-109*n* may not defined for users, a user with malicious intention cannot reset a UI 109*a*-109*n* to its default state. Moreover, since access to various UEs 107*a*-107*n* is typically limited prior to a public release, a user with malicious intentions cannot compare a UI 109*a* to another UI 109*b* to detect the UI elements that have changed.

In one embodiment, since the number of UEs 107*a*-107*n* and UI elements 401-423 is finite, manual modification of screenshots will reveal the UI elements that a malicious user has changed. This information can be used to detect the UE 107*a*-107*n* and the source of the leak. In other words, all the variations of UI elements 401-423 and the UEs 107*a*-107*n* that the variations are assigned to are previously determined and stored (for example in storage 215). Therefore, a manual modification by a malicious user when compared against the stored variations can reveal the source of the leak (UE 107*a*-107*n*).

In one embodiment, one or more web based services may be presented to the user of UE 107*a*-107*n*, wherein unique UI elements 401-423 associated with the web based services are presented as components of a web page layout. In this embodiment, the unique UI elements, created for a web page, may be linked to a certain UE 107*a*-107*n* that accesses the web page, to a user account associated with the accessing UE 107*a*-107*n*, to user details, to a web session ID, or a combination thereof. For example, a provider of web services may develop a new type of web based service (e.g. map service) which is available to the subcontractors of the service provider under a non-disclosure agreement. In this case, access to the web based service is granted to the subcontractors and its corresponding user accounts.

In one embodiment, when accessing the web based service from a user account associated with a subcontractor, the service UI may contain unique UI elements making each web service page unique for the specific user. This allows the user to be identified in a case of product leak. The unique UI in a web based service can be specific to a user account, to the UE used to access the service, or a combination thereof. Furthermore. The unique UI may also change every time the user accesses a web based service.

In one embodiment, the unique UI elements are created by the product leak detection platform 103 using the process of FIG. 3, wherein the screenshots from a web based service are analyzed by the product leak detection platform 103 (e.g. by the identifier recognition module 209) as previously discussed with regards to FIGS. 2 and 3.

As mentioned, UI elements may be part of the operating system and, thus, user may not be able to modify the UI elements, improving the security of the UI identification system. In addition, as indicated, uniqueness of UI elements makes it easier to detect the source of a leak from a picture such as, for instance, an online screenshot, a printed copy of the screenshot, a newspaper advertisement containing the screenshot, etc., as compared with traditional watermarks. Although malicious user may hide the UI elements in the leaked pictures to prevent their identification from being revealed, the leaked pictures will reveal less information about the product and, thus, the damage to the product provider 111*a*-111*n* will be reduced.

The processes described herein for providing product leak source identification may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
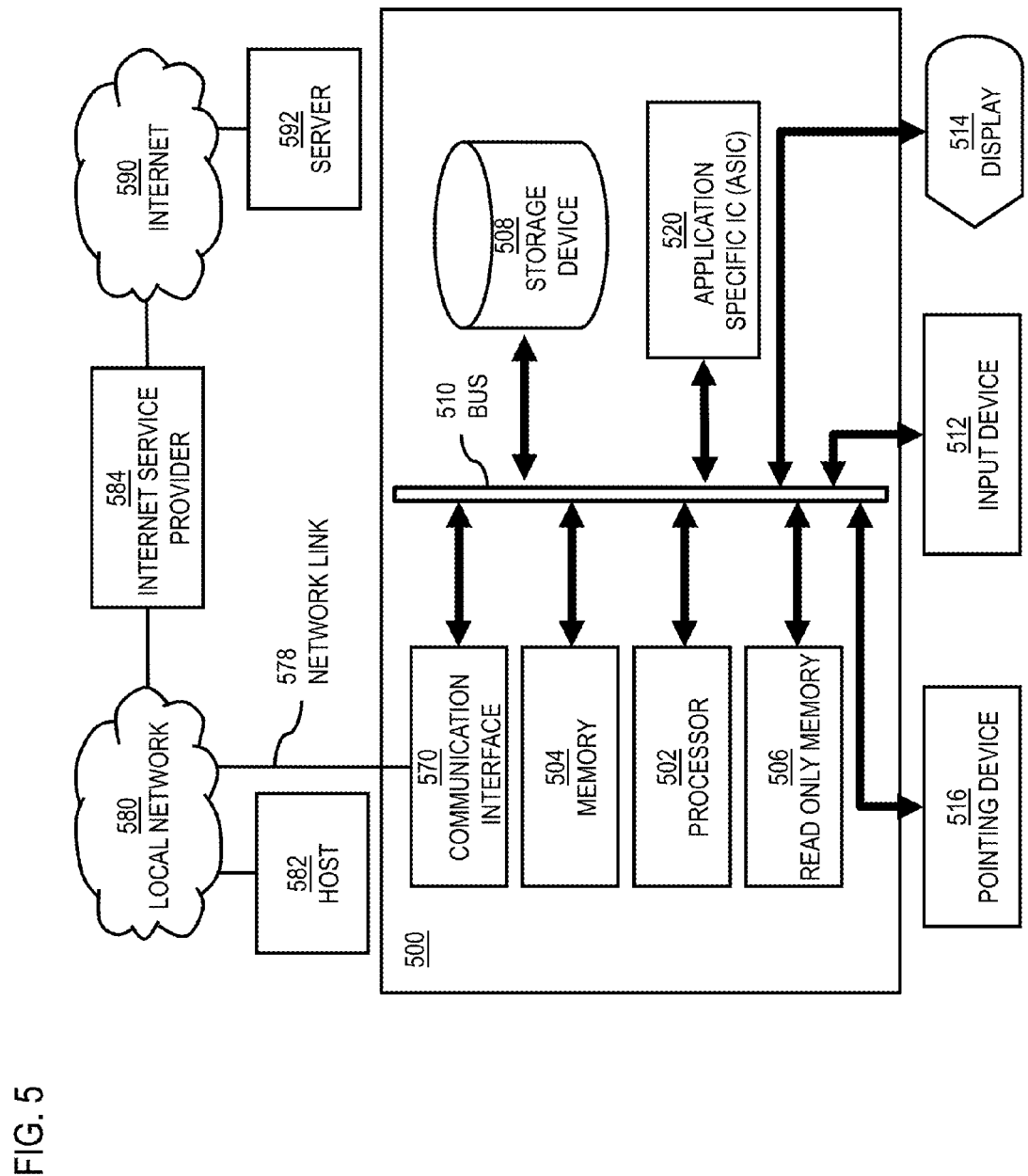
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide product leak source identification as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing product leak source identification.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing product leak source identification. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing product leak source identification. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing product leak source identification, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing product leak source identification to the UEs 107a-107n.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide product leak source identification as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing product leak source identification.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide product leak source identification. The memory 605 also stores the data associated with or generated by the execution of the inventive steps.

Figure 7:
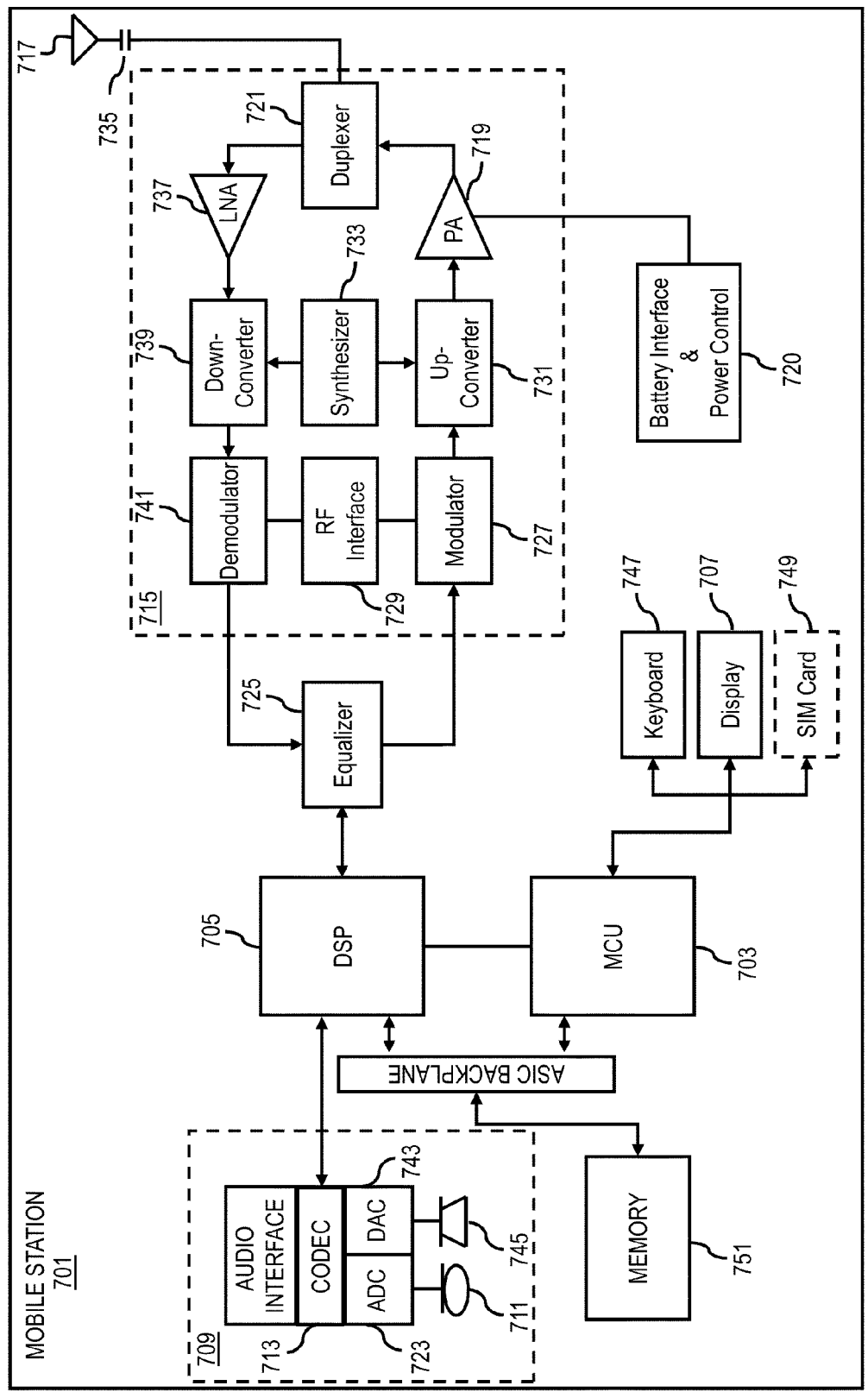
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing product leak source identification. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing product leak source identification. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide product leak source identification. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining one or more device identifiers associated with one or more devices;
    determining one or more variations of one or more user interface elements to be presented in at least one user interface of the one or more devices, wherein the one or more variations for each of the one or more user interface elements are assigned randomly and wherein the one or more variations correspond to respective one or more values of respective digits of a unique user interface identifier represented by the one or more user interface elements;
    linking the unique user interface identifier to the one or more device identifiers; and
    installing the one or more variations of the one or more user interface elements at the one or more devices,
    wherein a rendering of the one or more variations at the one or more devices facilitates, at least in part, a determination of the one or more device identifiers based on the unique user interface identifier.

2. A method of claim 1, further comprising:
    determining one or more other identifiers associated with one or more applications, one or more services, one or more processes, or a combination thereof associated with the at least one user interface,
    wherein the determination of the one or more variations is further based, at least in part, on the one or more other identifiers.

3. A method of claim 1, wherein the unique user interface identifier is further linked to one or more applications, one or more services, one or more processes, or a combination thereof executing on the one or more devices.

4. A method of claim 1, further comprising:
    generating an installation package including the one or more variations, wherein the installation of the one or more variations is via the installation package.

5. A method of claim 4, further comprising:
    determining a request to install one or more applications, one or more services, one or more processes, or a combination thereof associated with the one or more variations; and
    initiating the generation of the installation package based, at least in part, on the request.

6. A method of claim 1, further comprising:
    determining at least one sample of the at least one user interface, the at least one sample presenting at least a portion of the one or more variations; and
    processing the at least a portion of the one or more variations to determine the one or more identifiers based on the unique user interface identifier.

7. A method of claim 6, further comprising:
    processing the one or more identifiers to identify a source device, a source application, a source service, a source process, or a combination thereof from among the one or more devices.

8. A method of claim 1, wherein the one or more device identifiers include, at least in part, an International Mobile Equipment Identity (IMEI), a user name, a user account, a user communication identifier, a device name, a software version identifier, a hardware version identifier, or a combination thereof.

9. A method of claim 1, wherein the one or more user interface elements include, at least in part, one or more icons, one or more menus, one or more task bar items, one or more graphical elements, one or more buttons, or a combination thereof; and wherein the one or more variations are based, at least in part, on one or more shapes, one or more sizes, one or more positions, one or more colors, one or more fonts, one or more formats, one or more styles, one or more sounds, one or more animations, or a combination thereof.

10. An apparatus comprising:
at least one processor; and
at least one memory including computer program code for one or more programs, the at least one memory and the computer program code configured to, with the at least one processor, cause the apparatus to perform at least the following,
determine one or more device identifiers associated with one or more devices;
determine one or more variations of one or more user interface elements to be presented in at least one user interface of the one or more devices, wherein the one or more variations for each of the one or more user interface elements are assigned randomly and wherein the one or more variations correspond to respective one or more values of respective digits of a unique user interface identifier represented by the one or more user interface elements;
link the unique user interface identifier to the one or more device identifiers; and
install the one or more variations of the one or more user interface elements at the one or more devices,
wherein a rendering of the one or more variations at the one or more devices facilitates, at least in part, a determination of the one or more identifiers based on the unique user interface identifier.

11. An apparatus of claim 10, wherein the apparatus is further caused to:
determine one or more other identifiers associated with one or more applications, one or more services, one or more processes, or a combination thereof associated with the at least one user interface,
wherein the determination of the one or more variations is further based, at least in part, on the one or more other identifiers.

12. An apparatus of claim 10, wherein the unique user interface identifier is further linked to one or more applications, one or more services, one or more processes, or a combination thereof executing on the one or more devices.

13. An apparatus of claim 10, wherein the apparatus is further caused to:
generate an installation package including the one or more variations,
wherein the installation of the one or more variations is via the installation package.

14. An apparatus of claim 13, wherein the apparatus is further caused to:
determine a request to install one or more applications, one or more services, one or more processes, or a combination thereof associated with the one or more variations; and
initiate the generation of the installation package based, at least in part, on the request.

15. An apparatus of claim 10, wherein the apparatus is further caused to:
determine at least one sample of the at least one user interface, the at least one sample presenting at least a portion of the one or more variations; and
process the at least a portion of the one or more variations to determine the one or more identifiers based on the unique user interface identifier.

16. An apparatus of claim 15, wherein the apparatus is further caused to:
process the one or more identifiers to identify a source device, a source application, a source service, a source process, or a combination thereof from among the one or more devices.

17. An apparatus of claim 10, wherein the one or more device identifiers include, at least in part, an International Mobile Equipment Identity (IMEI), a user name, a user account, a user communication identifier, a device name, a software version identifier, a hardware version identifier, or a combination thereof.

18. An apparatus of claim 10, wherein the one or more user interface elements include, at least in part, one or more icons, one or more menus, one or more task bar items, one or more graphical elements, one or more buttons, or a combination thereof; and wherein the one or more variations are based, at least in part, on one or more shapes, one or more sizes, one or more positions, one or more colors, one or more fonts, one or more formats, one or more styles, one or more sounds, one or more animations, or a combination thereof.

19. A method of claim 1, further comprising:
randomly selecting the plurality of user interface elements from a set of all available user interface elements for the at least one user interface,
wherein the randomly selected plurality of user interface elements is used to represent the unique user interface identifier.

20. An apparatus of claim 10, wherein the apparatus is further caused to:
randomly select the plurality of user interface elements from a set of all available user interface elements for the at least one user interface,
wherein the randomly selected plurality of user interface elements is used to represent the unique user interface identifier.

* * * * *